F. C. FULLER.
INSULATING SCREEN OR CURTAIN.
APPLICATION FILED MAY 10, 1920.
1,361,977.
Patented Dec. 14, 1920.
FIG-1-
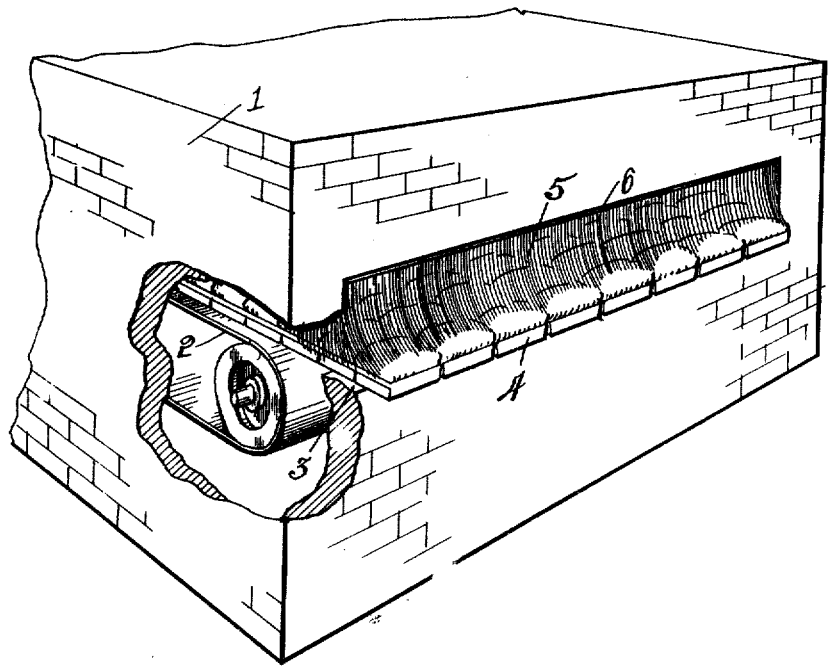
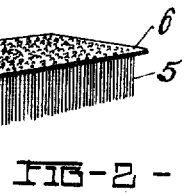
FIG-2-
INVENTOR
Frederick C. Fuller,
By Owen Owen & Crampton,
His attys.

UNITED STATES PATENT OFFICE.

FREDERICK C. FULLER, OF TOLEDO, OHIO.

INSULATING SCREEN OR CURTAIN.

1,361,977. Specification of Letters Patent. Patented Dec. 14, 1920.

Application filed May 10, 1920. Serial No. 380,115.

*To all whom it may concern:*

Be it known that I, FREDERICK C. FULLER, a citizen of the United States, and a resident of Toledo, in the county of Lucas and State of Ohio, have made an Invention Appertaining to Insulating Screen or Curtain; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to closure means for openings, and has for its primary object the provision of a screen or curtain for use in connection with the inlet or outlet openings of baking ovens, furnaces, leers, or other chambers, to effectually separate or insulate the interior from the exterior thereof and at the same time permit and automatically adjust itself to the passage of articles through the openings.

In the use, for instance, of baking ovens of the traveling type, considerable loss of heat and efficiency in baking is occasioned by the outlet opening of the oven being left open to permit the passage of the baked goods therethrough. My invention contemplates the suspension in the opening of a multiplicity of pliant members of asbestos, or other material suitable to withstand the action of the heat or other gases within the oven or chamber, such members coöperating to effectually close the opening and also adapted to be lifted up and to accommodate themselves to the shape of the articles passing through the opening and coöperating therewith to prevent an escape of the heat or other gases through the opening.

The invention is fully described in the following specification, and while, in its broader aspect, it is capable of embodiments and use in numerous connections, a preferred embodiment thereof is illustrated in the accompanying drawings, in which,—

Figure 1 is a perspective view of the outlet end of a traveling baking oven, with a portion broken away, with the baked goods emerging from the oven outlet opening, and with the closure means embodying the invention associated with the opening, and Fig. 2 is a perspective view of the closure member removed from the opening.

Referring to the drawings, 1 designates a baking oven, 2 a traveling conveyer of any suitable form therein, 3 the outlet opening from the oven through which the baked goods emerge, and 4 pans containing the baked goods.

The screen or curtain employed to close the opening 3 and embodying the invention comprises a multiplicity of pliant members 5 preferably of string-like form suspended within the opening from the top thereof and extending to the bottom of the opening so as to coöperate to effectually close or insulate the interior from the exterior of the oven. The members 5 may be made of asbestos or other material suitable to withstand the action of the heat or other gases within the oven or chamber with which associated, and in order to facilitate an insertion or removal of the screen from the opening the members 5 are preferably suspended from a plate 6 which is secured in any suitable manner in the top of the opening. The plate 6 may be perforated to permit the suspending of the members 5 therethrough or the members may be secured and suspended from the plate in any other suitable manner.

The screen or curtain in width is coextensive with the width of the opening 3 and may be of a length to extend through the opening and back into the oven or associated chamber any desired distance.

It is evident that when nothing is passing through the opening 3 the cords 5 comprising the curtain will hang to the bottom of the opening and serve to effectually close the same and that when articles are passing through the opening the curtain members will be moved out of obstructing relation thereto and will accommodate themselves to the shape of the articles so as to coöperate with the articles to close the opening and prevent the escape of heat or other gases therethrough.

It will be understood that the invention may be changed and modified in numerous respects without departing from the spirit of the claims and that it may be used in connection with any opening which it is desired to close and through which opening at the same time it may be desired to pass articles.

Having thus described my invention, what I claim as new, and desire to secure by Letters Patent, is,—

1. A curtain or screen for an opening of ovens or other chambers, comprising a plurality of suspended pliant members adapted to coöperate to close the opening and capable of displacement by articles passing through the opening.

2. A curtain or screen for an opening of ovens or other chambers, comprising a rigid member and a multiplicity of pliant members suspended from the rigid member and comprising a material for withstanding the gases within the associated chamber, the pliant members adapted to coöperate to close the opening and to permit displacement by articles passing through the opening.

3. The combination with a chamber having an opening therein through which articles may pass into or from the chamber, of a multiplicity of pliant members suspended within the opening from the top thereof and coöperating to close the opening against the passage of gases therethrough and to permit the passage of articles through the opening without uncovering the same.

4. The combination with means forming an oven or chamber and having an opening therein for the passage of articles, of a rigid member mounted within the upper portion of the opening, and a multiplicity of cord-like members suspended from the rigid member and coöperating to close the opening against the passage of gases therethrough and to permit the passage of articles therethrough.

5. The combination with a heating chamber having an opening therein through which articles may pass into or from the chamber, of a plurality of rows of pliant members suspended within the opening from the top thereof and extending across the same, the rows of pliant members coöperating to close the opening against the passage of gases therethrough and to permit the passage of articles through the opening without uncovering the same.

In testimony whereof I have hereunto signed my name to this specification.

FREDERICK C. FULLER.